United States Patent [19]
Woodward et al.

[11] 3,925,747
[45] Dec. 9, 1975

[54] FUEL SENDER MECHANISM FOR A MOTOR VEHICLE

[75] Inventors: Gary F. Woodward, Ann Arbor, Mich.; Lawrence J. Vanderberg, Hendersonville, N.C.

[73] Assignee: Ford Motor Company, Dearborn, Mich.

[22] Filed: Oct. 11, 1974

[21] Appl. No.: 514,060

[52] U.S. Cl. .................................... 338/33; 73/313
[51] Int. Cl.² ........................................ H01C 13/00
[58] Field of Search ........ 338/33, 164, 170; 73/313; 200/84

[56] References Cited
UNITED STATES PATENTS

| | | | |
|---|---|---|---|
| 1,902,933 | 3/1933 | Zubaty | 338/33 |
| 3,348,413 | 10/1967 | Zimmerle | 338/33 X |
| 3,449,955 | 6/1969 | Stadelmann | 73/313 |

Primary Examiner—C. L. Albritton
Attorney, Agent, or Firm—Robert W. Brown; Keith L. Zerschling

[57] ABSTRACT

An improved fuel sender mechanism for indicating the level of fuel in a fuel tank of a motor vehicle. The fuel sender is of the type having a tubular device extending from the exterior to the interior of the fuel tank to permit fuel to be withdrawn from the tank through the tubular device. A variable resistance device, secured to the tubular device, is controlled by a float mechanism that changes in position as a function of the fuel level in the fuel tank. The improvement comprises the addition of a flexible joint in the tubular device for the purpose of insuring that the fuel intake end of the tubular device is in contact with the bottom of the fuel tank, thereby, to permit precise location of the variable resistance device and the float mechanism controlling it.

1 Claim, 7 Drawing Figures

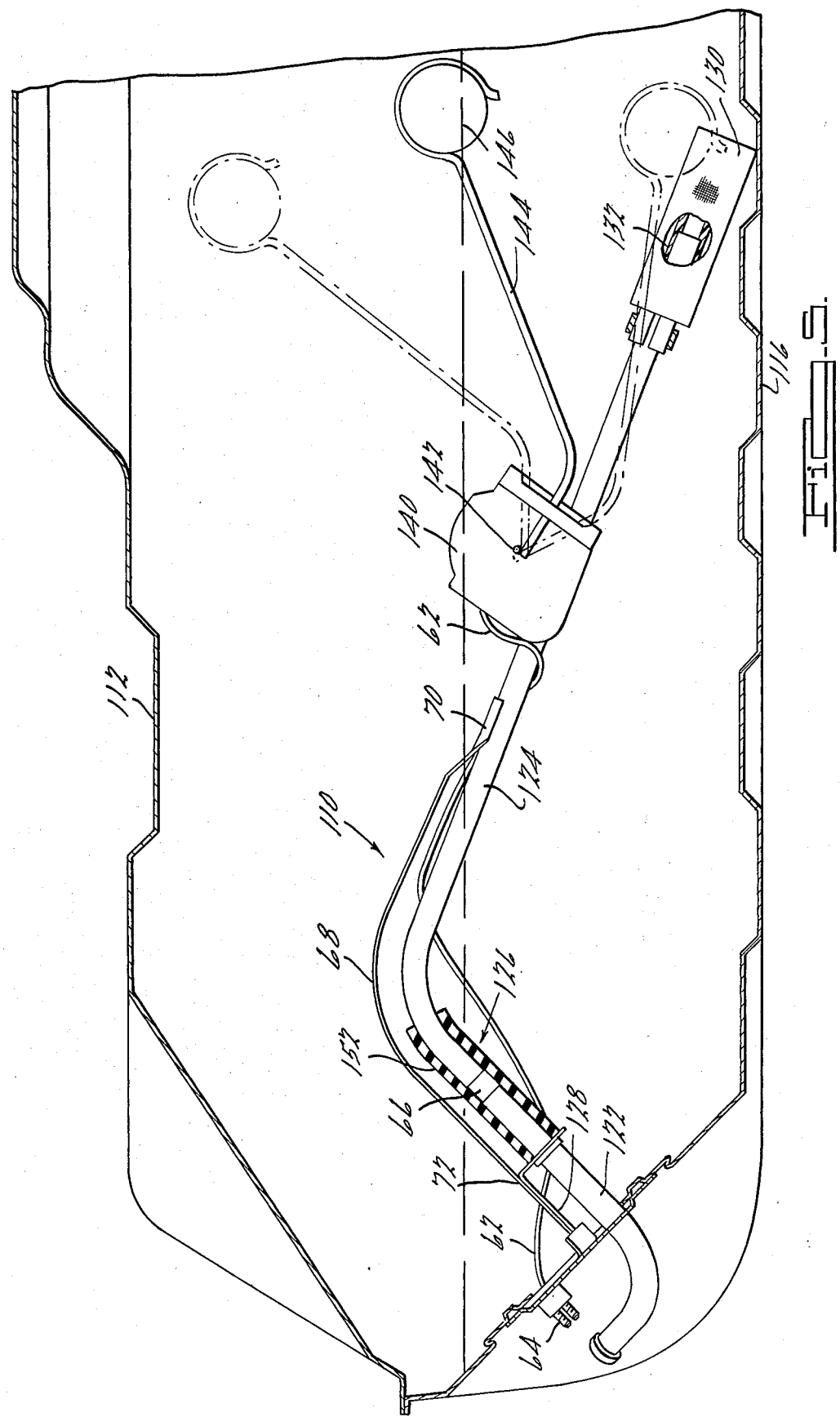

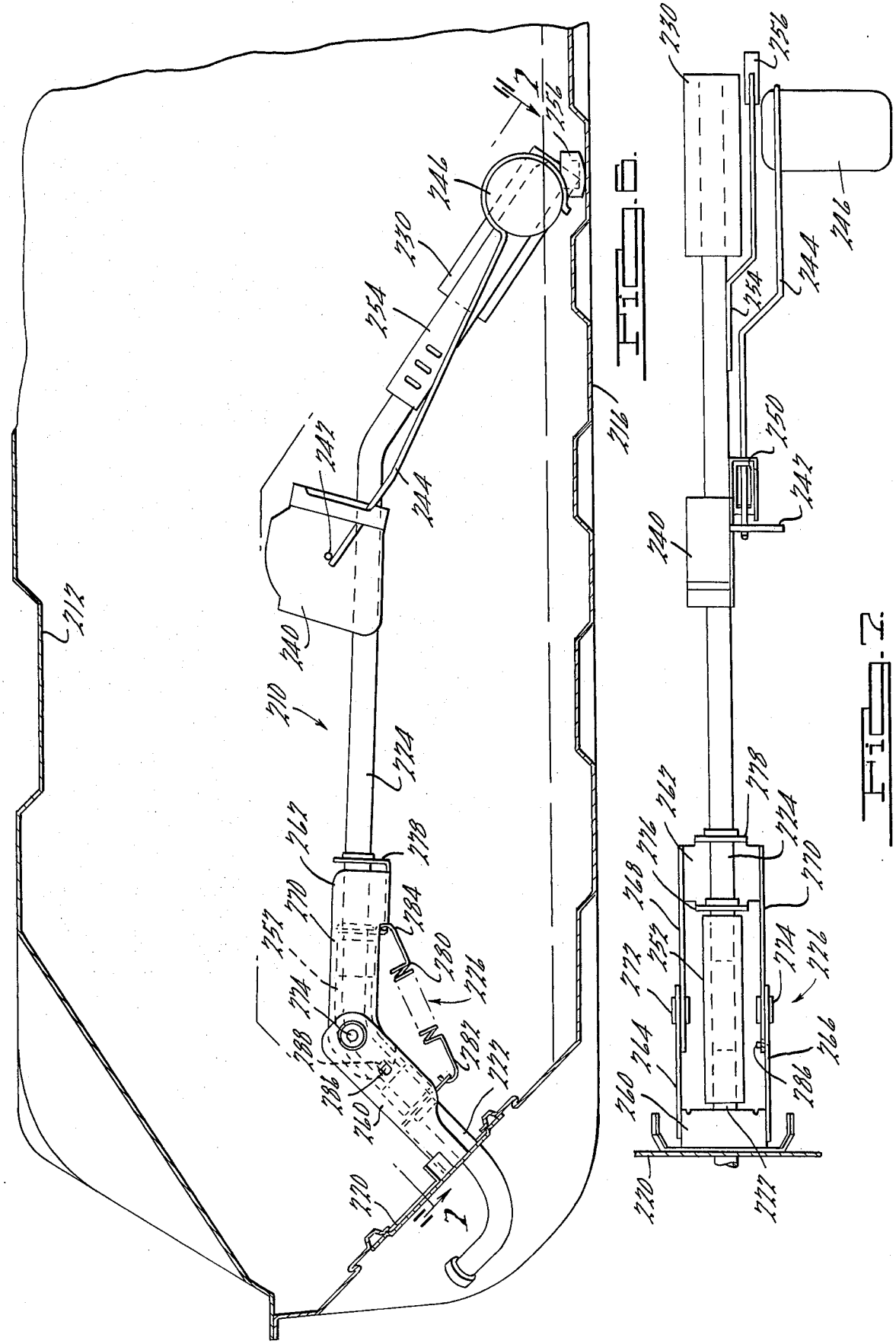

FUEL SENDER MECHANISM FOR A MOTOR VEHICLE

BACKGROUND

This invention relates to an improved fuel sender mechanism for indicating the level of fuel in the fuel tank of a motor vehicle.

A fuel sender is a mechanism located in the fuel tank of a motor vehicle for the purpose of providing an electrical signal or other indication of the level of fuel in the fuel tank. The improved fuel sender mechansim of the invention if of the type having a tubular device extending from the exterior to the interior of the fuel tank through an opening provided in the tank. The fuel used by the motor vehicle is withdrawn from the fuel tank through the tubular device. The fuel sender mechanism has a variable resistance device secured to the tubular device and a float mechanism which extends from the variable resistance device. The float mechanism varies the variable resistance in response to the level of fuel tank. The variable resistance device is connected to a gage circuit which responds to variations in the variable resistance device. Typically, the float portion of the float mechanism is located within the fuel tank as near to its vertical centerline as is practical. This minimizes the variation in float position resulting from the fuel sloshing about and also from changes in vehicle attitude.

It is desirable that the fuel sender mechanism enter the fuel tank through an opening in one of its sides, rather than through openings in either its top or bottom. If the fuel sender enters the fuel tank through the top, then clearance must be provided between the vehicle body and fuel tank for the portion of the fuel sender mechanism and attachments to it that are located exterior of the fuel tank. Also, entry of the fuel sender mechanism through the top of the tank usually requires removal of the fuel tank from the vehicle to enable repair or replacement of the fuel sender mechanism. Entry of the fuel sender mechanism through the bottom of the fuel tank renders this mechanism more susceptible to road hazard damage and may require additional road clearance.

Where the fuel sender mechanism enters the fuel tank through an opening in its side, the tubular device in the mechanism must be of considerable length in order to permit fuel to be withdrawn from the tank near its vertical centerline and in order to position the float on or near the vertical centerline. Thus, it may be appreciated that a small angular deviation with respect to the attachment of the fuel sender mechanism to the side of the fuel tank may effect a very significant deviation in the location of the float relative to its intended location. This, of course, results in a significant error in the fuel gage reading. This problem is particularly severe in shallow fuel tanks where vertical deviations in the location of the float mechanism and the variable resistance device have a greater proportionate effect on the gage readings than is the case with deep fuel tanks.

SUMMARY OF THE INVENTION

In accordance with the invention, an improved fuel sender mechanism of the type described above includes a flexible joint in its tubular device for the purpose of insuring that the fuel sender float mechanism and variable resistance device assume a predetermined location with reference to the bottom of the fuel tank. This may be accomplished because the flexible joint permits the intake end of the tubular device, or a fuel fitter attached to it, to contact the bottom of the fuel tank. Preferably, spring means are provided for biasing the fuel intake end of the tubular device towards the bottom of the fuel tank. The tubular device may comprise two metal tubular elements interconnected by a piece of non-metallic flexible tubing, thereby, forming the flexible joint at the location of the piece of flexible tubing. Although the spring means may take various forms, in the preferred form it comprises a pair of spring steel elements, each spring steel element being welded to the two metal tubular elements and having ribs extending in an arcuate path along the length of the piece of flexible tubing.

The invention may be better understood by reference to the detailed description which follows and to the drawings.

BRIEF DESCRIPTION OF THE DRAWINGS

FIG. 5 is a sectional view of a fuel tank including a second embodiment of an improved fuel sender mechanism of the invention;

FIG. 6 is a central sectional view of a fuel tank including a third embodiment of an improved fuel sender mechanism in accordance with the invention; and FIG. 7 is a view, taken along the line 7—7, in FIG. 6, of the fuel sender mechanism in FIG. 6.

DETAILED DESCRIPTION

Figures 1, 2, 3, 4:
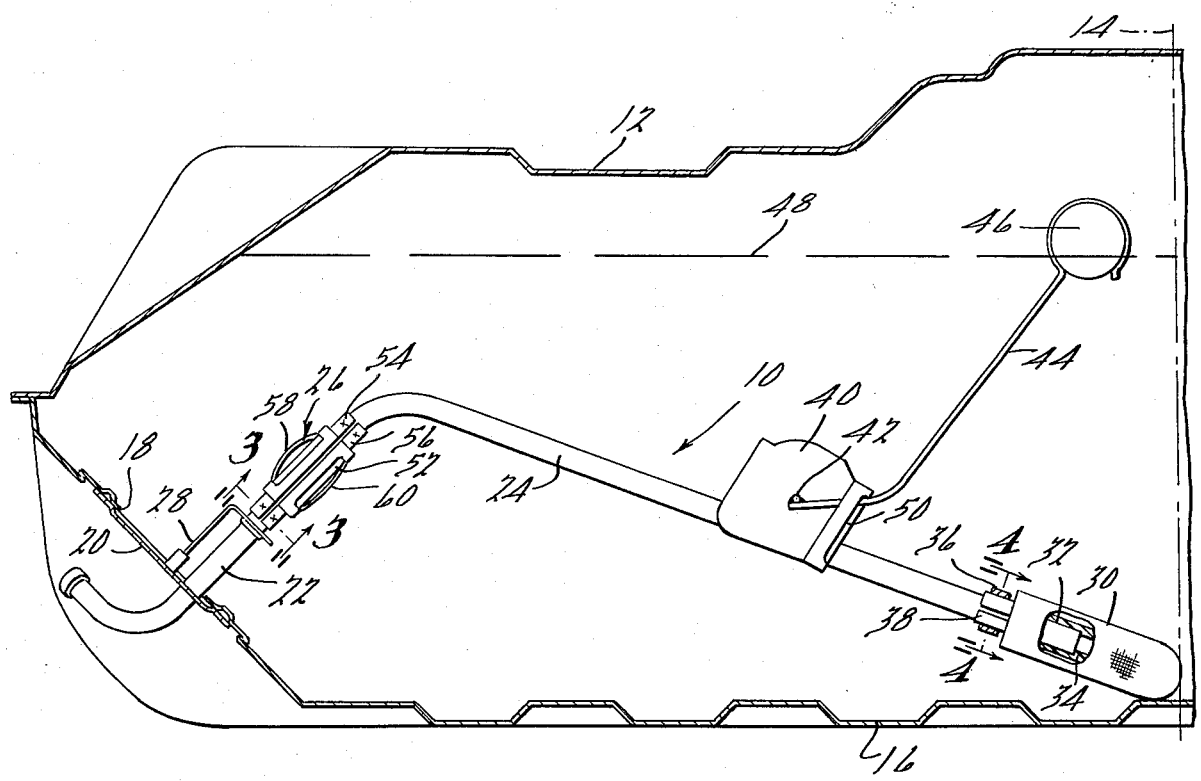
FIG. 1 is a central sectional view of a fuel tank including a preferred form of the improved fuel sender mechanism of the invention.
FIG. 2 is an enlarged view of a flexible joint and spring bias means included in the improved fuel sender mechanism of FIG. 1.
FIG. 3 is an enlarged sectional view taken along the line 3—3 in FIG. 1.
FIG. 4 is an enlarged sectional view taken along the line 4—4 in FIG. 1.

With reference now to the drawings, wherein like numerals refer to like parts in the several views, there are shown several embodiments of an improved fuel sender mechanism in accordance with the invention.

The preferred embodiment of the invention shown in FIGs. 1 through 4 includes a fuel sender mechanism 10 centrally located within a motor vehicle fuel tank 12. Numeral 14 designates the vertical centerline of the fuel tank 12 and its bottom is indicated at 16. The fuel sender mechanism 10 is inserted into the fuel tank 12 through a large diameter opening 18 in its left side as viewed in FIG. 1.

The fuel sender mechanism 10 includes a circular mounting plate 20 that is attached to the fuel tank 12 to position the fuel sender mechanism 10 within the fuel tank. A tubular device in the fuel sender mechanism includes a first metal tubular element 22 and a second tubular metal element 24, which are interconnected by a flexible joint 26. The tubular element 22 extends from the exterior of the fuel tank, through an opening in the mounting plate 20, into the interior of the fuel tank. A support arm 28 is connected at one of its ends to the mounting plate 20 and at its other end is secured to the tubular element 22 to provide additional support for the fuel sender mechanism 10.

The tubular element 24 has a fuel filter 30 mounted on its fuel intake end 32. The fuel filter 30 is of circular cross section and has an opening extending along its axis. The intake end 32 of the tubular element 24 extends into this opening which is of reduced diameter at 34 for the purpose of establishing the axial location of the fuel filter on the tubular element 24. A clamp 36 is crimped on an extending portion 38 of the filter 30 to secure it to the tubular element 24. In the withdrawal of fuel from the fuel tank 12, the fuel enters the intake end 32 of the tubular element 24 through the fuel filter 30. The fuel flows through the tubular element 24, the flexible joint 26, and the tubular element 22 to the exterior of the fuel tank.

A variable resistance device 40 is mounted on the tubular element 24. The variable resistance device has rotatable shaft 42 the position of which determines the resistance of the variable resistance device. A float mechanism, including a wire arm 44 and a float 46, is attached to the shaft 42. As the float 46 moves up or down in response to changes in the fuel level 48, the arm 44 moves in a slot 50 formed on the exterior of the variable resistance device 40. Movement of the arm 44 rotates the shaft 42 and changes the resistance of the device 40. The slot 50 limits the travel of the float mechanism.

The flexible joint 26 may best be seen in FIGS. 2 and 3. The tubular elements 22 and 24 are butted together and interconnected by a piece of flexible rubber tubing 52 having an inner diameter approximately equal to the outer diameters of the tubular elements 22 and 24.

Spring means are provided for biasing the intake end 32 of the tubular element 24 toward the bottom 16 of the fuel tank 12. The spring means includes identical spring steel elements 54 and 56. The spring means steel elements 54 and 56 may be made from 0.015 spring steel and may be heat treated to a Rockwell C-50 hardness. Each of the spring steel elements 54 and 56 has one of its ends welded to the tubular element 22 and has its opposite end welded to the tubular element 24, as indicated in FIG. 2 by cross marks. The spring steel element 54 has a rib 58 which extends in an arcuate path along the length of the piece of flexible tubing 52. Similarly, the spring steel element 56 has a rib 60 which extends in an arcuate path along the length of the flexible tubing. Each of the elements 54 and 56 also has two additional ribs 57 extending along the length of the piece of flexible tubing 52, but these are not in an arcuate path although, if desired, they may extend in an arcuate path or additional arcuate ribs may be provided. The ribs 57 provide torsional stiffness for the fuel sender mechanism 10 and prevent bending in a plane parallel to the bottom of the fuel tank.

In FIG. 2, the spring steel elements 54 and 56 are illustrated in their relaxed position. In FIG. 1, these elements are illustrated in their deformed condition which produces a biasing force tending to urge the intake end 32 of the tubular element 24 toward the bottom 16 of the fuel tank 12. In this deformed condition, the rib 58 is under compression such that it has a reduced radius of curvature and the rib 60 is under tension such that it has an increased radius of curvature. The force then produced in the spring elements 54 and 56 tends to restore these elements to their relaxed condition shown in FIG. 2. An advantage produced by the presence of the rib 60 under tension is that it limits the amount that the tubular element 24 can be deflected.

With the improved fuel sender mechanism illustrated in FIGS. 1 through 4, the tubular element 24 always has its intake end 32 located in a fixed position relative to the bottom 16 of the fuel tank 12. Thus, the bottom of the fuel tank serves as a reference point that establishes the location of the variable resistance device 40 and the float 46. During installation of the fuel sender mechanism in the fuel tank 12, the entire mechanism may be inserted into the fuel tank through the opening 18 therein. The angular relationship of the tubular element 22 with respect to the side of the fuel tank through which it passes may vary somewhat as a result of manufacturing tolerances and variables, but the presence of the flexible joint 26 with its spring biasing means assures that the intake end 32 of the mechanism and the variable resistance device 40 will bear a predetermined relationship with respect to the bottom 16 of the fuel tank. In prior art, fuel sender mechanisms, the tubular device in the mechanism would be formed from a single piece of metal tubing and would not include the flexible joint 26 so that variations in angular relationship of the portion 22 of the tubular device with respect to the side of the fuel tank might easily result in a significant variation in the location of the variable resistance device 40 and the float 46 at a given fuel level with respect to their intended positions at such fuel level. In connection with FIG. 1, it should be understood that an electrical lead wire must extend from the exterior of the fuel tank to the variable resistance device 40. In the embodiment of the invention illustrated in FIG. 5, such a lead wire 62 is shown as well as a ground connection at a terminal 64.

With respect to the embodiment shown in FIG. 5, there is shown a fuel tank 112 having a bottom 116. An improved fuel sender mechanism 110 located within the fuel tank includes a first tubular element 122, a second tubular element 124 interconnected with the tubular element 122 by a flexible joint 126, and a fuel filter 130 in contact with the bottom of the fuel tank. The fuel filter 130 fits over the intake end 132 of the tubular element 124. A variable resistance device 140 is secured to the tubular element 124 and has a rotatable shaft 142 controlled by a float mechanism including a wire element 144 which retains a float 146. The position of the float mechanism fluctuates with changing fuel levels in the fuel tank. The extreme positions of the float mechanism are indicated the the dot-dash lines in FIG. 5.

The flexible joint 126 is formed by a piece of flexible rubber tubing 152 which interconnects the tubular elements 122 and 124. In the FIG. 5 embodiment, the tubular elements 122 and 124 do not abut one another in the flexible joint 126, but rather have a space 66 formed between them. A leaf spring element 68 is welded at 70 to the tubular element 124 and is attached at 72 to a support arm 126 which provides support for the fuel sender mechanism. When the fuel sender mechanism is installed in the fuel tank 112, its intake end 132 is deflected slightly upwardly as viewed in FIg. 5 to produce a force in the leaf spring 68 tending to urge the intake end 132 toward the bottom 116 of the fuel tank. This maintains the intake end 132 and the variable resistance device 140 at a predetermined location relative to the bottom 116 of the fuel tank. Also, the spring force exerted on the intake end 132 tends to prevent rattles which might occur at the point of contact of the filter 130 with the bottom 116 of the fuel tank were the flexible joint 126 to be provided in the absence of the leaf spring 68. Of course, the spring steel elements 54 and 56 in the embodiment illustrated in FIGS. 1 through 4 also perform this anti-rattle function.

With particular reference now to the embodiment shown in FIGS. 6 and 7, there is shown a fuel tank 212 having a bottom 216 and a fuel sender mechanism 210 that is inserted into the fuel tank though its side and attached to the fuel tank by means of a mounting plate 220. A first tubular element 222 extends from the exterior of the fuel tank intoits into its A piece of flexible rubber tubing 252 interconnects the tubular element 222 with a second tubular element 224. The piece of rubber tubing 252 forms a portion of a spring loaded flexible joint 226. A fuel filter 230 is attached to the intake end of the tubular elemment 224 and a variable resistance device 240 is welded or otherwise secured to the tubular element 224. The variable resistance device has a rotatable shaft 242 to which a wire element 244 is attached. The wire element 244 forms a part of a float mechanism that includes a float 246 retained by the wire 244. A bracket forming a part of the variable resistance device 240 has a slot 250 in it which limits the travel of the float mechanism and the rotation of the shaft 242 in response thereto. An arm 254 is welded to the tubular element 224 and has a locating foot 256 in contact with the bottom 216 of the fuel tank.

The flexible joint 226 includes brackets 260 and 262. The bracket 260 is welded to the mounting plate 220 and has arms 264 and 266 which extend in a direction parallel to the tubular element 222. The bracket 262 has arms 268 and 270 which extend in a direction parallel with the tubular element 224 and which are joined to the arms 264 and 266, respectively, of the bracket 260 at pivot points 272 and 274. The bracket 262 has upstanding portions 276 and 278 which include openings through which the tubular element 224 passes. The bracket 262 is secured to the tubular element 224 at these upstanding portions. A tension spring 280 is connected at its end 282 to the bracket 260 and at its end 284 to the bracket 262. When the fuel sender mechanism is installed in the fuel tank 212 as shown, the tension spring 280 urges the locating foot 256 into contact with and toward the bottom 216 of the fuel tank. A pin 286 in the arm 266 of the bracket 260 cooperates with a slot 288 in the arm 270 of the bracket 262 to limit rotation of the tubular element 224 about the pivot point 274.

In the embodiments illustrated in FIGS. 1, 5 and 6, the fuel sender mechanisms enter the fuel tank through its side and then extend in a downward direction. Were a fuel sender mechanism to enter a fuel tank from its front or back side and then be bent in a direction such that its tubular device extends downwardly and also toward one of the sides of the fuel tank, then a flexible joint and torsional spring means in the tubular device may be provided to maintain the float mechanism and variable resistance device in a predetermined relationship with respect to the bottom of the fuel tank.

Based upon the foregoing description, what is claimed is:

1. An improved fuel sender mechanism for indicating the level of fuel in a fuel tank of a motor vehicle, said fuel sender mechanism being of the type having a tubular device extending from the exterior to the interior of said fuel tank to permit fuel to be withdrawn therefrom through said tubular device, said fuel sender mechanism having a variable resistance device secured to said tubular device and a float mechanism extending from said variable resistance device, said float mechanism varying said variable resistance in response to the level of fuel in said fuel tank, wherein the improvement comprises: a flexible device in said tubular device to permit said float mechanism and variable resistance device to assume a predetermined location with reference to the bottom of said fuel tank, said tubular device comprising first and second tubular metallic elements, said first element extending from the exterior of said fuel tank to the interior thereof and said second tubular element abutting said first tubular element in said fuel tank, said variable resistance device and said float mechanism being attached to said second tubular element, said abutting first and second tubular elements being interconnected by a piece of flexible tubing having an inner diameter approximately equal to the outer diameters of said first and second tubular elements, and spring means for biasing said second tubular element toward the bottom of said fuel tank, said spring means comprising a pair of identical spring steel elements, each of said spring steel elements having one of its ends welded to said first tubular element and having its opposite end welded to said second tubular element, and each of said spring steel elements having a plurality of ribs, one of said ribs extending in an arcuate path along the length of said piece of flexible tubing and an other rib extending along said piece of flexible tubing to provide torsional stiffness in the flexible joint formed by the interconnection of said first and second tubular elements by said piece of flexible tubing and spring means.

* * * * *